US012613677B2

(12) United States Patent (10) Patent No.: US 12,613,677 B2

Matsui (45) Date of Patent: Apr. 28, 2026

(54) ARITHMETIC DEVICE AND METHOD

(71) Applicant: Kioxia Corporation, Tokyo (JP)

(72) Inventor: Hajime Matsui, Yokohama (JP)

(73) Assignee: Kioxia Corporation, Tokyo (JP)

( * ) Notice: Subject to any disclaimer, the term of this patent is extended or adjusted under 35 U.S.C. 154(b) by 1073 days.

(21) Appl. No.: 17/643,615

(22) Filed: Dec. 10, 2021

(65) Prior Publication Data

US 2023/0093203 A1 Mar. 23, 2023

(30) Foreign Application Priority Data

Sep. 21, 2021 (JP) ................................. 2021-153456

(51) Int. Cl.
G06F 7/72 (2006.01)
(52) U.S. Cl.
CPC .................................... G06F 7/724 (2013.01)
(58) Field of Classification Search
CPC ................................................. G06F 7/72–729
See application file for complete search history.

(56) References Cited

U.S. PATENT DOCUMENTS

| | | | |
|---|---|---|---|
| 7,486,789 B2 | 2/2009 | Futa et al. | |
| 8,111,826 B2 | 2/2012 | Takashima | |
| 8,204,232 B2 | 6/2012 | Struik et al. | |
| 2002/0059353 A1* | 5/2002 | Koc | G06F 7/72 |
| | | | 708/491 |
| 2019/0073196 A1* | 3/2019 | Hiscock | G06F 12/0895 |
| 2022/0083624 A1* | 3/2022 | Matsui | G06F 21/64 |

FOREIGN PATENT DOCUMENTS

JP 5373026 B2 12/2013

OTHER PUBLICATIONS

Mrabet et al., "An efficient and scalable modular inversion/division for public key cryptosystems," 2017 International Conference on Engineering & MIS (ICEMIS), Monastir, Tunisia, 2017, pp. 1-6, doi: 10.1109/ICEMIS.2017.8272995. (Year: 2017).*
Hennessy et al., "Computer Organization and Design: The Hardware/ Software Interface", Fifth Edition, Chapter 4 p. 242-365, 2014. Retrieved from <https://ict.iitk.ac.in/wp-content/uploads/CS422-Computer-Architecture-ComputerOrganizationAndDesign5thEdition2014.pdf> (Year: 2014).*
Walter, "Montgomery Exponentiation Needs No Final Subtractions", Electronics Letters, vol. 35 No. 21, Oct. 1999, 4 pages.

* cited by examiner

*Primary Examiner* — Carlo Waje
(74) *Attorney, Agent, or Firm* — Oblon, McClelland, Maier & Neustadt, L.L.P.

(57) ABSTRACT

According to an embodiment, an arithmetic device outputting an arithmetic result on a finite field with characteristic P includes a hardware processor. The hardware processor performs readout processing of a plurality of input values. The hardware processor performs, for each word, arithmetic operations with respect to the plurality of input values by using a value being based on the characteristic P and a comparison value between each input value of the plurality of input values and the characteristic P. The hardware processor outputs a first output value resulting from computing a value being based on each input value of the plurality of input values, the comparison value, and the characteristic P. The hardware processor outputs a second output value resulting from comparing the first output value and the characteristic P.

20 Claims, 12 Drawing Sheets

FIG.3

```
U = 0;
D = 0;
for (k=0; k<m; k=k+1) begin
    load P(k); // INPUT UNIT                              ~601 load A₁(k); // INPUT UNIT                             ~602
    U += A₁(k) - P(k) * q[A₁]; // ADDER/MULTIPLIER        ~603 load A₂(k); // INPUT UNIT                             ~604
    U += A₂(k) - P(k) * q[A₂]; // ADDER/MULTIPLIER        ~605

Z(k) = U(0);
    store Z(k); // OUTPUT UNIT                            ~606

D += U(0) - P(k); // COMPARATOR                       ~607

D >>= W;
    U >>= W;                                             ~608
end
if (D > 0) begin
  q[Z] = 1;
end else begin                                          ~609
  q[Z] = 0;
end
```

FIG.6

```
U = 0;
D₁ = 0;
D₂ = 0;
D₃ = 0;
for (k=0; k<m; k=k+1) begin
    load P(k); // INPUT UNIT load A₁(k); // INPUT UNIT
    U += A₁(k) - P(k) * q[A₁]; // ADDER/MULTIPLIER load A₂(k); // INPUT UNIT
    U += A₂(k) - P(k) * q[A₂]; // ADDER/MULTIPLIER load A₃(k); // INPUT UNIT                              ⌐~~621
    U += A₃(k) - P(k) * q[A₃]; // ADDER/MULTIPLIER         ⌐~~622 load A₄(k); // INPUT UNIT                              ⌐~~623
    U += A₄(k) - P(k) * q[A₄]; // ADDER/MULTIPLIER         ⌐~~624

Z(k) = U(0);
    store Z(k); // OUTPUT UNIT

D₁ += U(0) - P(k); // COMPARATOR
    D₂ += U(0) - P(k) * 2; // COMPARATOR                   ⌐~~625
    D₃ += U(0) - P(k) * 3; // COMPARATOR

D₁ >>= W;
    D₂ >>= W;
    D₃ >>= W;
    U >>= W;
end
if (D₃ > 0) begin
    q[Z] = 3;
end else if (D₂ > 0) begin
    q[Z] = 2;
end else if (D₁ > 0) begin                                 ⌐~~626
    q[Z] = 1;
end else begin
    q[Z] = 0;
end
```

FIG.7

```
U = 0;
D = 0;
for (k=0; k<m; k=k+1) begin
    load P(k); // INPUT UNIT
    U += P(k); // ADDER/MULTIPLIER                    631 load A₁(k); // INPUT UNIT
    U += A₁(k) - P(k) * q[A₁]; // ADDER/MULTIPLIER load A₂(k); // INPUT UNIT
    U -= A₂(k) - P(k) * q[A₂]; // ADDER/MULTIPLIER Z(k) = U(0);
    store Z(k); // OUTPUT UNIT D += U(0) - P(k); // COMPARATOR U >>= W;
    D >>= W;
end
if (D > 0) begin
  q[Z] = 1;
end else begin
  q[Z] = 0;
end
```

FIG.8

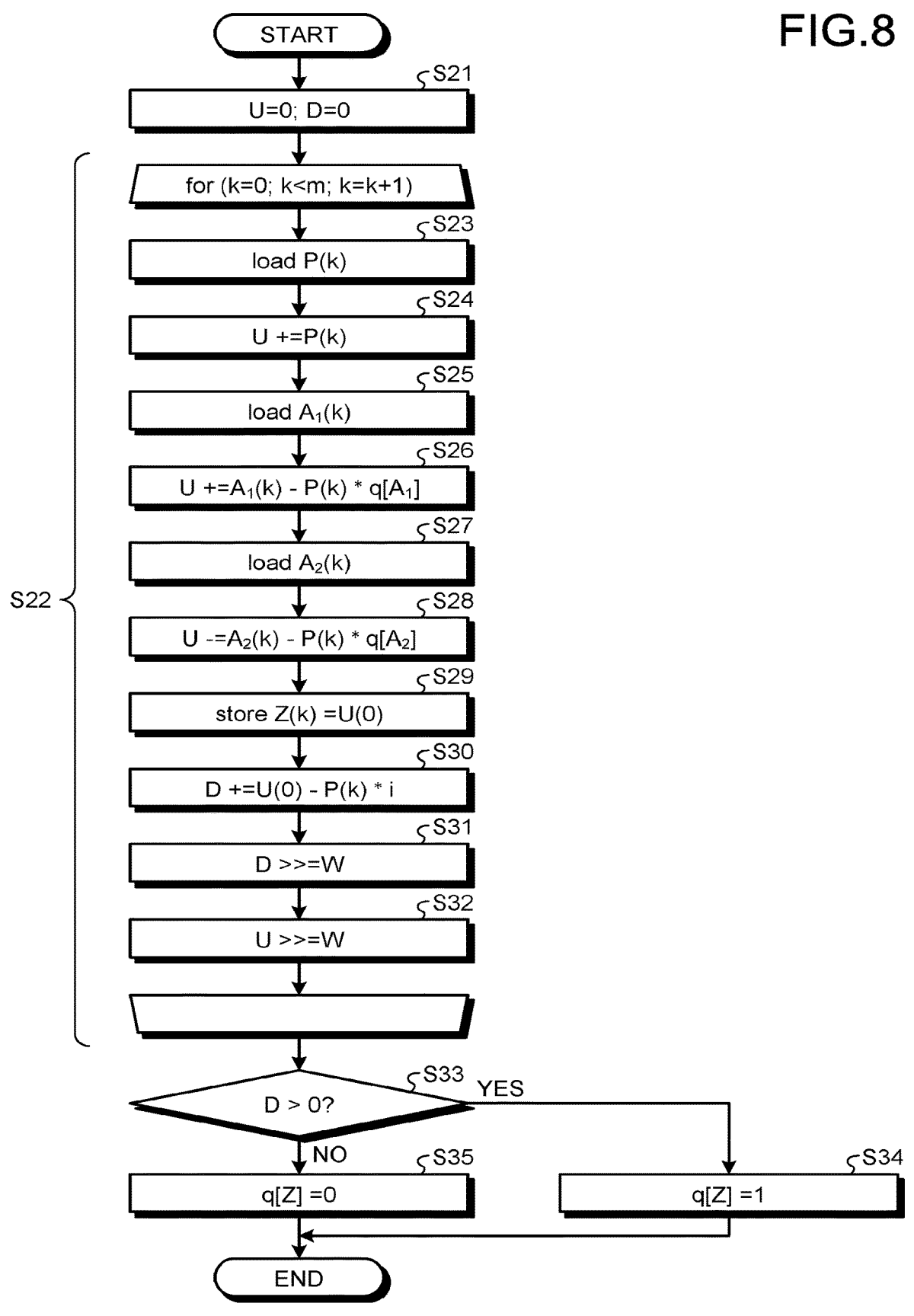

START

S21
$U=0; D=0$ for ($k=0; k<m; k=k+1$)

S23
load $P(k)$

S24
$U += P(k)$

S25
load $A_1(k)$

S26
$U += A_1(k) - P(k) * q[A_1]$

S27
load $A_2(k)$

S28
$U -= A_2(k) - P(k) * q[A_2]$

S29
store $Z(k) = U(0)$

S30
$D += U(0) - P(k) * i$

S31
$D >>= W$

S32
$U >>= W$

S22

S33
$D > 0?$ — YES

NO

S35
$q[Z] = 0$

S34
$q[Z] = 1$

END

FIG.9

```
U = 0;
for (k=0; k<m*2-1; k=k+1) begin
  for (j=max(0, k-m+1); j<min(m, k+1); j=j+1) begin
    U += A(k-j) * B(j);
    if (j == k) Q(j) = U(0) * P';
    U += P(k-j) * Q(j);
  end
  if (k >= m+1) Z(k-(m+1)) = U(0);
  U >>= W;                                              642
end
Z(m-1) = U(0);
                                                        641
```

ARITHMETIC DEVICE AND METHOD

CROSS-REFERENCE TO RELATED APPLICATIONS

This application is based upon and claims the benefit of priority from Japanese Patent Application No. 2021-153456, filed on Sep. 21, 2021; the entire contents of which are incorporated herein by reference.

FIELD

Embodiments described herein relate generally to an arithmetic device and a method.

BACKGROUND

In some cases, signature verification or signature grant processing is performed by executing an arithmetic operation on a finite field. In such a case, it is desirable that the arithmetic operation on the finite field be performed at high speed.

BRIEF DESCRIPTION OF THE DRAWINGS

FIG. 3 illustrates pseudocode that the arithmetic device according to the first embodiment performs;

FIG. 6 illustrates pseudocode that the arithmetic device according to the first embodiment performs;

FIG. 7 illustrates pseudocode of modular subtraction according to a second embodiment;

FIG. 8 is a flowchart of the modular subtraction according to the second embodiment;

FIG. 9 illustrates pseudocode of Montgomery multiplication according to a third embodiment;

DETAILED DESCRIPTION

According to one embodiment, an arithmetic device outputting an arithmetic result on a finite field with characteristic P includes a hardware processor. The hardware processor performs readout processing of a plurality of input values. The hardware processor performs, for each word, arithmetic operations with respect to the plurality of input values by using a value being based on the characteristic P and a comparison value between each input value of the plurality of input values and the characteristic P. The hardware processor outputs a first output value resulting from computing a value being based on each input value of the plurality of input values, the comparison value, and the characteristic P. The hardware processor outputs a second output value resulting from comparing the first output value and the characteristic P.

A memory system to which an arithmetic device according to an embodiment is applied and a method will be exemplarily described below. Note that an apparatus to which the arithmetic device according to the embodiment can be applied is not limited to the memory system. The arithmetic device according to the embodiment can be applied to any apparatus including a memory that stores a computer program and a hardware processor that executes the computer program. The memory system to which the arithmetic device according to the embodiment is applied will be described in detail below with reference to the accompanying drawings. Note that the present invention is not limited to the embodiment.

First Embodiment

An arithmetic device according to a first embodiment serves as a device for outputting an arithmetic result on a finite field with characteristic P. The arithmetic device can be used for a digital signature of firmware in a memory system such as a solid state drive (SSD). In such a digital signature, used are a key generation algorithm, a signature generation algorithm, and a signature verification algorithm. The key generation algorithm generates a pair of a public key and a secret key. The signature generation algorithm receives the firmware and the secret key and performs signature generation processing to generate a signature. The signature verification algorithm receives the firmware, the public key, and the signature, and then performs signature verification processing to verify the signature.

Figure 1:
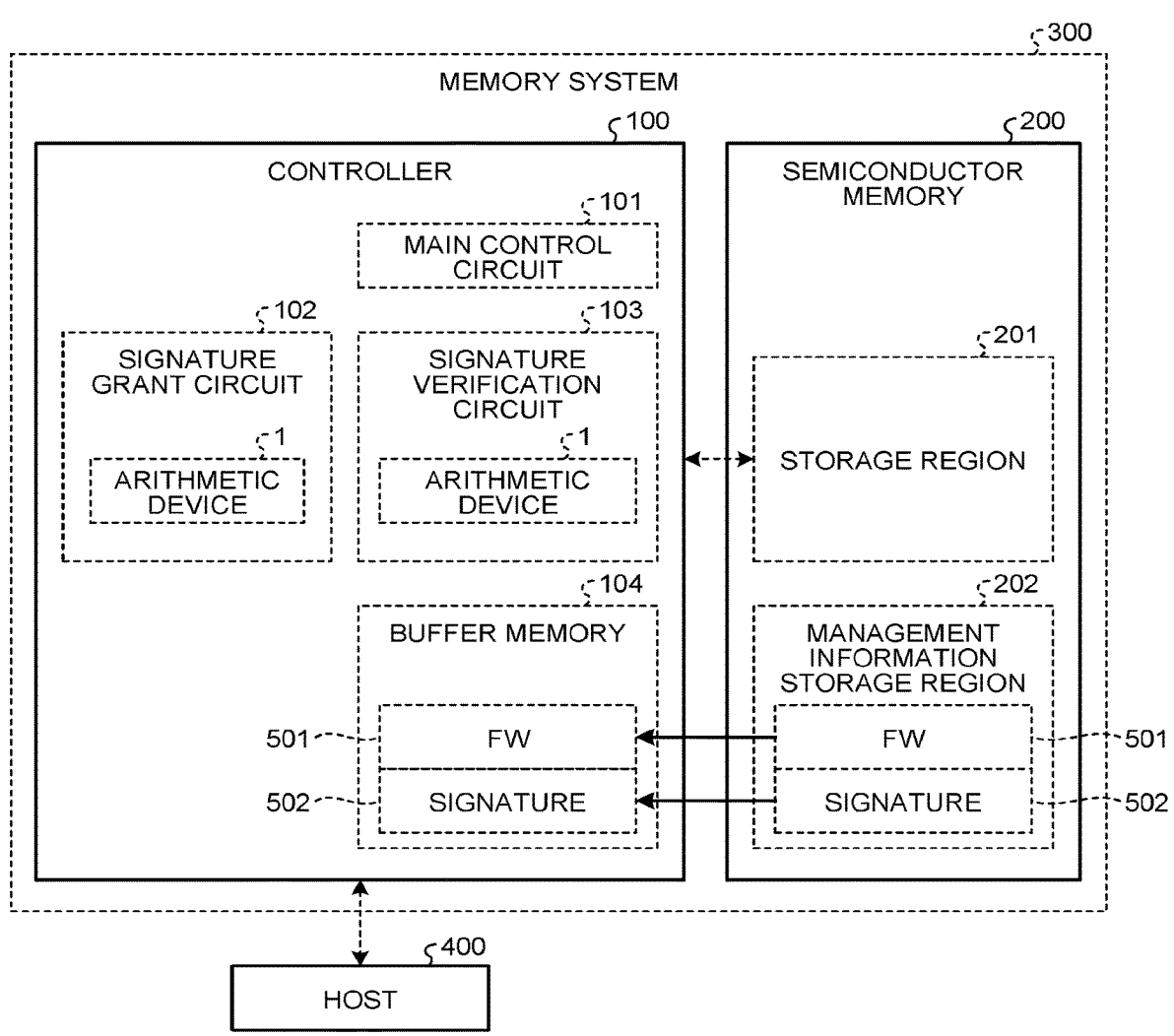
FIG. 1 illustrates an exemplary configuration of a memory system to which an arithmetic device according to a first embodiment is applied.

For example, a memory system 300, to which a host 400 is coupled and to which a controller 100 including an arithmetic device 1 is applied, is structured as illustrated in FIG. 1. FIG. 1 illustrates the configuration of the memory system 300 to which the controller 100 including an arithmetic device 1 is applied. The memory system 300 includes the controller 100 and a semiconductor memory 200. The controller 100 includes a main control circuit 101, a signature grant circuit 102, a signature verification circuit 103, and a buffer memory 104. The signature verification circuit 103 includes an arithmetic device 1. The arithmetic device 1 can be provided as an arithmetic circuit. The semiconductor memory 200 serves as a nonvolatile semiconductor memory (for example, a NAND flash memory). The semiconductor memory 200 includes a storage region 201 and a management information storage region 202. User data can be stored in the storage region 201. In the management information storage region 202, firmware (FW) 501 and a signature 502 are stored. The signature 502 is a digital signature. The signature 502 may be generated by the signature grant circuit 102 or may be generated outside the memory system 300.

At the time of startup of the firmware 501 in the memory system 300, the controller 100 temporarily stores the firmware 501 and the signature 502 into the buffer memory 104, and performs, with the signature verification circuit 103, signature verification processing to the firmware 501. In the signature verification processing, the signature verification circuit 103 obtains the hash value of the firmware 501, and extracts a value which is based on the public key from the signature 502. Then, by using the hash value of the firmware 501 and the extracted value, the signature verification circuit 103 determines whether or not a predetermined condition is satisfied.

For example, the signature verification circuit 103 may perform signature verification processing in accordance with an elliptic curve digital signature algorithm (ECDSA) method. The signature verification circuit 103 obtains the hash value of the firmware 501. The signature verification circuit 103 performs, with the arithmetic device 1, arithmetic operation on a predetermined part of the signature 502. The signature verification circuit 103 obtains a predetermined parameter by using the hash value and the signature 502. The signature verification circuit 103 obtains the coordinate value of a point on the elliptic curve by using the public key and the predetermined part of the signature 502. The signature verification circuit 103 determines, as the predetermined condition, whether or not a match is satisfied between a second part different from the predetermined part of the signature 502 and the coordinate value of the point on the elliptic curve.

When the predetermined condition is satisfied, the signature verification circuit 103 determines that no unauthorized alteration has been made and outputs a result of approval. In response to this output, the controller 100 starts the firmware 501, and then, for example, develops the functional module of the firmware 501 onto the buffer memory 104. In a case that the predetermined condition is not satisfied, the signature verification circuit 103 determines that an unauthorized alteration may have been made and outputs a result of refusal. In response to this output, the controller 100 does not start the firmware 501. As a result, the memory system 300 enables detection/prevention of an unauthorized alteration in the firmware 501 at the time of startup.

For enhancing the speed of startup of the firmware 501 in the memory system 300, enhancement of the speed of signature verification processing at the time of startup is required. For enhancing the speed of signature verification processing, required is enhancement of the speed of arithmetic operations in signature verification processing. When verifying the digital signature in accordance with a method such as ECDSA, the signature verification circuit 103 performs the arithmetic operation on the finite field with the arithmetic device 1. The arithmetic operation requires iteration processing with multiple precision, so that a vast increase in computational cost may be caused. Multiple precision refers to the precision corresponding to the total bit length of a plurality of words computed by using a multiplier a plurality of times.

The arithmetic operation on the finite field includes processing of comparison with the characteristic P and subtraction processing of the characteristic P. The comparison processing and the subtraction processing are each multiple-precision arithmetic and are each performed over a plurality of cycles. In this case, a determination of whether the subtraction processing should be performed is executed on the basis of a comparison result of the comparison processing. Thus, the subtraction processing is required to wait to finish the comparison processing, resulting in a deterioration in the performance of arithmetic operation.

Therefore, in the present embodiment, the arithmetic device 1 reads out in advance a comparison result between an input value and the characteristic P, and performs arithmetic operation by using the readout comparison result. For example, the arithmetic device according to the present embodiment performs modular arithmetic of a multiple-precision integer of a plurality of words modulo the characteristic P odd in number.

Figure 2:
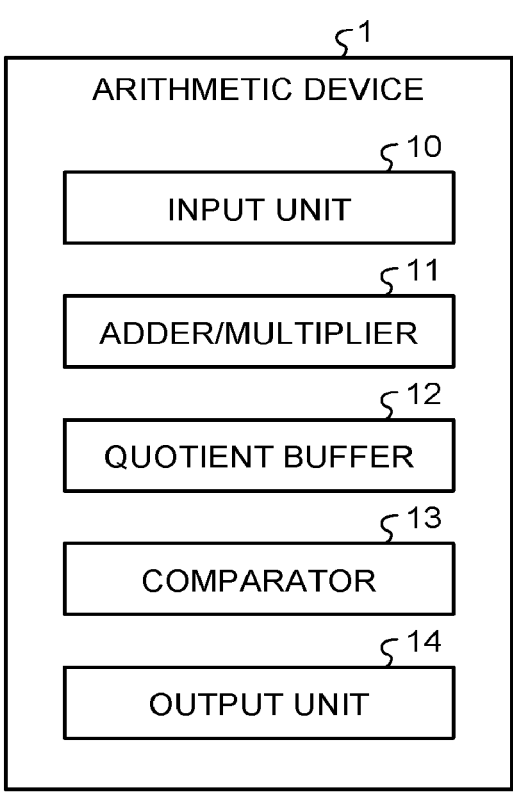
FIG. 2 is a block diagram of an exemplary functional configuration of the arithmetic device according to the first embodiment.

FIG. 2 is a block diagram of an exemplary functional configuration of the arithmetic device 1 according to the embodiment. As illustrated in FIG. 2, the arithmetic device

1 includes an input unit 10, an adder/multiplier 11, a quotient buffer 12, a comparator 13, and an output unit 14.

The input unit 10 reads out a plurality of input values. The input unit 10 acquires an address of data of the signature 502 from the signature verification circuit 103 and inputs an input value that is the value stored in the address. The input unit 10 inputs the characteristic P(k) from the signature verification circuit 103.

The adder/multiplier 11 adds or multiplies the input values input by the input unit 10, together. For the input values A1, . . . , An, the adder/multiplier 11 calculates and outputs the sum S=A1+ . . . +An. The quotient buffer 12 serves as a buffer that stores a division result from comparator 13 at an index which is specified by an output address. The comparator 13 calculates the quotient (comparison value) Q=S/P, on the basis of the sum S and the characteristic P. The output unit 14 writes an addition result on an output address.

Note that an external memory, such as a static random access memory (SRAM) or a dynamic random access memory (DRAM), stores the multiple-precision integer X. In the initial state, the condition $0 \leq X < P$ may be satisfied. In this case, each quotient value included in the quotient buffer is initialized to be zero. The condition $0 \leq X < P$ may not necessarily be satisfied. In this case, the initial quotient value may be received from outside.

Examples of modular arithmetic modulo P include the following operations.

$$Z=A+B|\mathrm{mod}|P \tag{1}$$

$$Z=A-B|\mathrm{mod}|P \tag{2}$$

$$Z=A\times B|\mathrm{mod}|P \tag{3}$$

$$Z=A\times B^{-1}|\mathrm{mod}|P \tag{4}$$

Note that the arithmetic device 1 does not need to be capable of calculating all the above operations and thus performs at least addition or subtraction. The arithmetic device 1 may be capable of calculating the following compound operations in which a plurality of arithmetic operations is simultaneously performed.

$$Z=A+B+C+D|\mathrm{mod}|P \tag{5}$$

$$Z=A+B-C-D|\mathrm{mod}|P \tag{6}$$

$$Z=A\times B+C\times D|\mathrm{mod}|P \tag{7}$$

$$Z=A\times B+C+D|\mathrm{mod}|P \tag{8}$$

A processing procedure with n=2, that is, with $A_1$ and $A_2$ as input values, in which the arithmetic device 1 calculates $Z=A_1+A_2|\mathrm{mod}|$ P, will be described by using pseudocode illustrated in FIG. 3. Here, X(k) represents the k-th word counted from the LSB of X. q[X] represents the quotient value to X included in the quotient buffer. m represents the word number for Z and $A_k$. One word corresponds to W bits.

As illustrated in FIG. 3, the input unit 10 inputs the characteristic P(k) (Description 601). The input unit 10 inputs $A_1$(k) (Description 602). The adder/multiplier 11 adds, to the variable U, the difference value between $A_1$(k) and P(k)×q[$A_1$] (Description 603). The input unit 10 inputs $A_2$(k) (Description 604). The adder/multiplier 11 adds, to the variable U, the difference value between $A_2$(k) and P(k)×q [$A_2$] (Description 605). Then, the output unit 14 inputs U(0) to Z(k) and outputs Z(k) having U(0) input therein (Description 606).

The comparator 13 adds, to the variable D, the difference between U(0) and P(k) (Description 607). The variables D and U are shifted by W bits (Description 608).

After the arithmetic device 1 performs loop processing, when the variable D is more than 0, 1 is input to q[Z]. When the variable D is not more than 0, 0 is input to q[Z] (Description 609).

According to the processing above, the condition $0 \leq Z \leq 2P$ is satisfied in a case of $0 \leq A_1$ and $A_2 \leq 2P$. Therefore, the calculation result Z of modular addition can be used as an input to other modular addition. As above, performing a plurality of arithmetic operations, the final arithmetic result Z' satisfies the condition $0 \leq Z' \leq 2P$. In this case, by additionally performing modular addition $Z''=Z'$ |mod| P with n=1, the final arithmetic result can satisfy the condition $0 \leq Z'' < P$.

Figure 4:
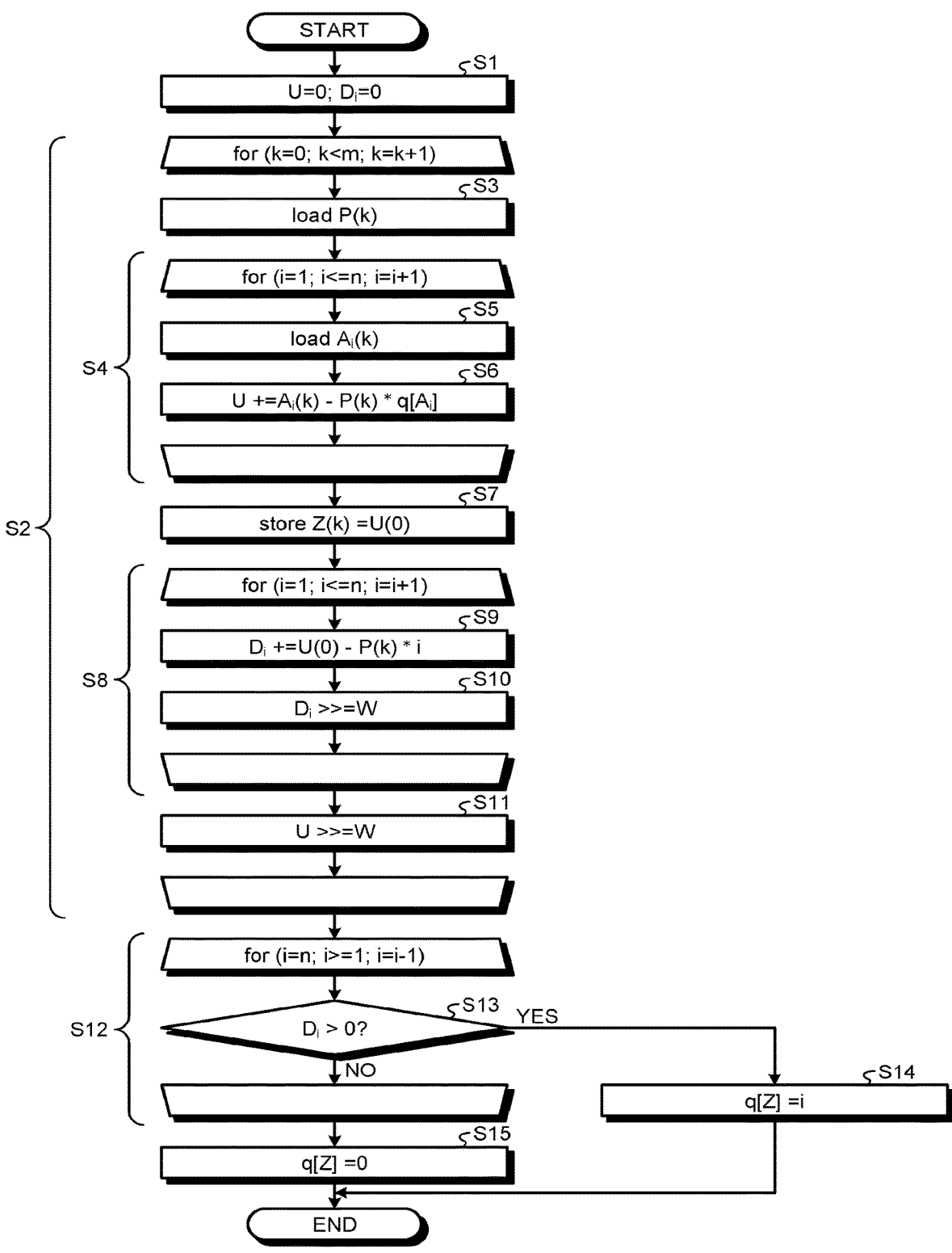
FIG. 4 is a flowchart that the arithmetic device according to the first embodiment performs.

Next, a processing procedure for calculation of $Z=A_1++A_n$|mod| P based on the pseudocode described above will be described with a flowchart illustrated in FIG. 4.

First, the input unit 10 initializes the variables U and $D_i$ (Step S1). Subsequently, the arithmetic device 1 performs loop processing until the variable k reaches m (Step S2). In the loop processing indicated in Step S2, the input unit 10 inputs P(k) (Step S3). Subsequently, in the loop processing of Step S4, the input unit 10 inputs each input value $A_i$ (Step S5). After that, the adder/multiplier 11 adds, to the variable U, the difference value between $A_i(k)$ and $P(k) \times q[A_i]$ (Step S6). The output unit 14 inputs U(0) to Z(k) and outputs Z(k) having U(0) input therein (Step S7).

Subsequently, in the loop processing of Step S8, the comparator 13 adds, to the variable $D_i$, the difference between U(0) and $P(k) \times i$ (Step S9). The comparator 13 shifts the variable $D_i$ by W bits (Step S10). The arithmetic device 1 shifts the variable U by W bits (Step S11).

Subsequently, in the loop processing of Step S12, the output unit 14 determines whether or not the variable $D_i$ is larger than 0 (Step S13). When the variable $D_i$ is larger than 0 (Step S13: Yes), the output unit 14 outputs the value of i to q[Z] stored in the quotient buffer 12 (Step S14). In the loop of Step S12, when the variable $D_i$ is not more than 0 (Step S13: No), the output unit 14 outputs 0 to q[Z] stored in the quotient buffer (Step S15).

In order to improve the efficiency of the calculation described above, the arithmetic device 1 may change a sequential order of processing or may perform pieces of processing in parallel while maintaining retention in dependency. Here, pipeline processing in the present embodiment will be described with FIG. 5.

Figure 5:
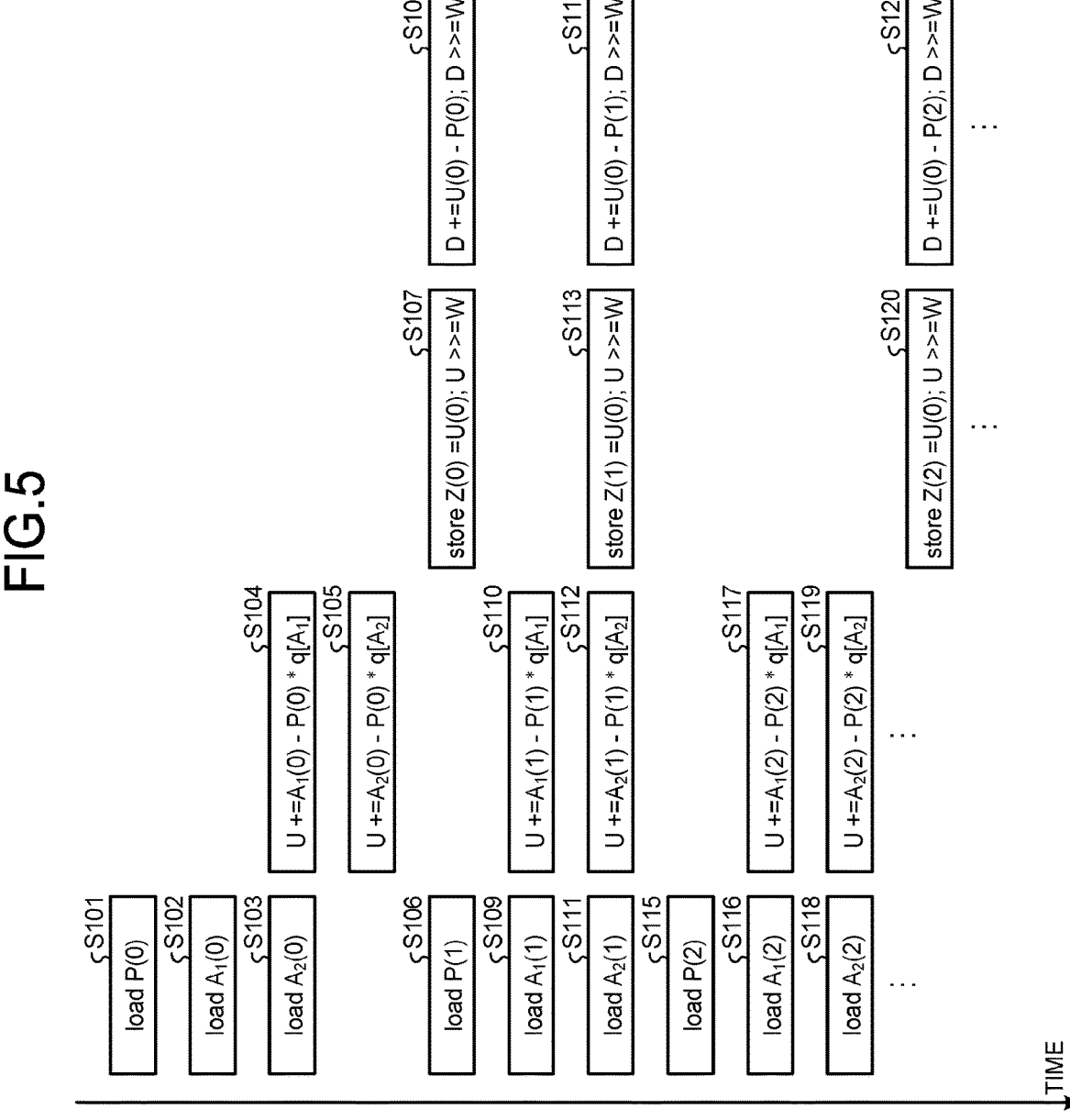
FIG. 5 illustrates pipeline processing according to the first embodiment.

FIG. 5 is a sequence diagram of pipeline processing of calculation of $Z=A_1+A_2$|mod| P. The input unit 10 inputs P(0) (Step S101). Then, the input unit 10 inputs $A_1(0)$ (Step S102). Then, the input unit 10 inputs $A_2(0)$ (Step S103). In parallel to Step S103, the adder/multiplier 11 adds, to the variable U, the difference value between $A_1(0)$ and $P(0) \times q[A_1]$ (Step S104). Next, the adder/multiplier 11 adds, to the variable U, the difference value between $A_2(0)$ and $P(0) \times q[A_2]$ (Step S105).

Subsequently, the input unit 10 inputs P(1) (Step S106). At this timing, in parallel to the execution of Step S106, the output unit 14 inputs U(0) into Z(k) and outputs Z(k) having U(0) input therein (Step S107). In parallel to Step S107, the comparator 13 adds, to the variable D, the difference between U(0) and P(0) (Step S108).

Next, the input unit 10 inputs $A_1(1)$ (Step S109). At the timing of termination of Step S109, the adder/multiplier 11 adds, to the variable U, the difference value between $A_1(1)$ and $P(1) \times q[A_1]$ (Step S110). Then, the input unit 10 inputs $A_2(1)$ (Step S111). The adder/multiplier 11 adds, to the variable U, the difference value between $A_2(1)$ and $P(1) \times q[A_2]$ (Step S112). In parallel at this timing, the output unit 14 inputs U(0) into Z(1) and outputs Z(1) having U(0) input therein (Step S113). In parallel to Step S113, the comparator 13 adds, to the variable D, the difference between U(0) and P(1) (Step S114).

Subsequently, the input unit 10 inputs P(2) (Step S115). Then, the input unit 10 inputs $A_1(2)$ (Step S116). At the timing of termination of Step S116, the adder/multiplier 11 adds, to the variable U, the difference value between $A_1(2)$ and $P(2) \times q[A_2]$ (Step S117). Next, the input unit 10 inputs $A_2(2)$ (Step S118). The adder/multiplier 11 adds, to the variable U, the difference value between $A_2(2)$ and $P(2) \times q[A_2]$ (Step S119). Next, the output unit 14 inputs U(0) into Z(2) and outputs Z(2) having U(0) input therein (Step S120). The comparator 13 adds, to the variable D, the difference between U(0) and P(2) (Step S121).

As above, the arithmetic device 1 can bring the input unit 10, the adder/multiplier 11, the comparator 13, and the output unit 14 in parallel processing.

The example with n=2 has been given above. Processing with n=4, that is, with $A_1, A_2, A_3$, and $A_4$ as input values will be described along with pseudocode illustrated in FIG. 6.

As illustrated in FIG. 6, the input unit 10 inputs $A_3(k)$ and $A_4(k)$ in addition to $A_1(k)$ and $A_2(k)$ (Descriptions 621 and 623). The adder/multiplier 11 adds, to the variable U, the difference value between $A_3(k)$ and $P(k) \times q[A_3]$, and adds, to the variable U, the difference value between $A_4(k)$ and $P(k) \times q[A_4]$ (Descriptions 622 and 624).

The comparator 13 adds, to the variable $D_2$, the difference between U(0) and $P(k) \times 2$, and adds, to the variable $D_3$, the difference between U(0) and $P(k) \times 3$ (Description 625). After termination of the loop processing, on the basis of the respective values of the variables $D_1, D_2$, and $D_3$, the value of q[Z] is set (Description 626).

According to the processing above, the condition $0 \leq Z \leq 4P$ is satisfied in a case of $0 \leq A_1, A_2, A_3$, and $A_4 \leq 4P$. In order to calculate the quotient q[Z] for $Z=A1+ \ldots +A_n$, the comparator 13 may be formed with (n−1) subtracters at most.

In the embodiment described above, the processing executed by the arithmetic device 1 in the signature verification processing of the signature verification circuit 103 has been described. Also in the signature generation processing of the signature grant circuit 102, a signature may be generated by using the function of the arithmetic device 1.

In the embodiment described above, the input unit 10 reads out, for each word, A1 and A2 as a plurality of input values. The adder/multiplier 11 performs, for each word, arithmetic operations with respect to the input values by using the value which is based on the characteristic P and the comparison value between the characteristic P and the input value. The output unit 14 of the arithmetic device 1 outputs, as the addition result Z (first output value), U (value) computed on the basis of the input value, the comparison value, and the characteristic P. The comparator 13 of the arithmetic device 1 outputs, to the quotient buffer, q[Z] resulting from comparing U and the characteristic P.

In this case, the arithmetic device 1 outputs q[Z] (second output value) resulting from comparison between the addition result Z and the characteristic P after performing, for each word, arithmetic operations with respect to the input values by using the value which is based on the characteristic P and the comparison value between the characteristic P and the input value. Thus, use of the output q[Z] in the subsequent processing enables achievement of pipeline processing. As a result, the arithmetic device 1 can perform arithmetic operation on the finite field at high speed.

Second Embodiment

In a second embodiment, exemplary modular subtraction will be described. A memory system 300 according to the present embodiment is similar in configuration to the memory system 300 according to the first embodiment illustrated in FIG. 1. An arithmetic device 1 according to the present embodiment is similar in functional configuration to the arithmetic device 1 according to the first embodiment illustrated in FIG. 2. For example, with n=2, modular subtraction $Z=A_1-A_2|\text{mod}|$ P is regarded as $Z=A_1+(P-A_2)$ $|\text{mod}|$ P. A processing procedure for modular subtraction according to the second embodiment will be described along with pseudocode illustrated in FIG. 7. Hereinafter, the difference from the pseudocode illustrated in FIG. 3 will be mainly described.

Calculation is performed in accordance with, for example, the following pseudocode. According to the processing, for $0 \le A_1$ and $A_2 \le 2P$, the condition $0 \le Z \le 2P$ is satisfied. Therefore, the calculation result Z of modular subtraction can be used as an input to other modular subtraction. In addition, the calculation result of modular subtraction can be used as an input to different modular addition, or the calculation result of modular addition can be used as an input to different modular subtraction.

As illustrated in FIG. 7, an input unit 10 inputs the characteristic P(k) from the signature verification circuit 103, and an adder/multiplier 11 adds the characteristic P(k) to the value stored in the variable U (Description 631). After that, the input unit 10 performs the processing in Description 602 illustrated in FIG. 3, and the adder/multiplier 11 performs the processing in Description 603. Then, the difference value between $A_1(k)$ and $P(k) \times q[A_1]$ is added to the variable U. As above, before adding the difference value between $A_1(k)$ and $P(k) \times q[A_1]$ to the variable U, the adder/multiplier 11 adds the value of the characteristic P(k) to the variable U. After the input unit 10 inputs $A_2(k)$, the adder/multiplier 11 subtracts, from the variable U, the difference value resulting from subtraction of $P(k) \times q[A_2]$ from $A_2(k)$. The subsequent processing is performed similarly to the above-described processing from Description 606 to Description 609 in FIG. 3.

Next, a processing procedure for calculation of $Z=A_1-A_2|\text{mod}|$ P based on the pseudocode described above will be described with a flowchart illustrated in FIG. 8.

First, the input unit 10 initializes the variables U and $D_i$ (Step S21). Subsequently, the arithmetic device 1 performs loop processing until the variable k reaches m (Step S22). In the loop processing indicated in Step S22, pieces of processing according to Steps S23 to S32 are performed.

In Step S23, the input unit 10 inputs P(k) (Step S23). Subsequently, in Step S24, the adder/multiplier 11 adds the characteristic P(k) to the variable U (Step S24). The input unit 10 inputs the input value $A_1(k)$ (Step S25). Subsequently, the adder/multiplier 11 adds, to the variable U, the difference value between $A_1(k)$ and $P(k) \times q[A_1]$ (Step S26). Then, the input unit 10 inputs the input value $A_2(k)$ (Step S27). The adder/multiplier 11 subtracts, from the variable U, the difference value between $A_2(k)$ and $P(k) \times q[A_2]$ (Step S28). The output unit 14 inputs U(0) into Z(k) and outputs Z(k) having U(0) input therein (Step S29). The comparator 13 adds, to the variable D, the difference between U(0) and $P(k) \times i$ (Step S30). The comparator 13 shifts the variable D by W bits (Step S31). The arithmetic device 1 shifts the variable U by W bits (Step S32).

Subsequently, in processing of Step S33, the output unit 14 determines whether or not the variable D is more than 0

(Step S33). When the variable D is more than 0 (Step S33: Yes), the output unit 14 outputs 1 to q[Z] in the quotient buffer 12 (Step S34). In the processing of Step S33, when the variable D is not more than 0 (Step S33: No), the output unit 14 outputs 0 to q[Z] in the quotient buffer 12 (Step S35).

In the arithmetic device 1 according to the present embodiment, the processing of addition of the characteristic P is performed before performing arithmetic operation with respect to a plurality of input values. Thus, even when performing subtraction of a plurality of input values, the arithmetic device 1 according to the present embodiment outputs q[Z] like the arithmetic device 1 according to the first embodiment, resulting in having an effect similar to the effect of the arithmetic device 1 according to the first embodiment.

Third Embodiment

In a third embodiment, exemplary Montgomery multiplication will be described. A memory system 300 according to the present embodiment is similar in configuration to the memory system 300 according to the first embodiment illustrated in FIG. 1. An arithmetic device 1 according to the present embodiment is similar in functional configuration to the arithmetic device 1 according to the first embodiment illustrated in FIG. 2. A processing procedure for Montgomery multiplication $Z=A \times B \times 2^{-N}|\text{mod}|$ P will be described along with pseudocode illustrated in FIG. 9. As a premise, with a method in Walter, C. (1999), Montgomery exponentiation needs no final subtractions, Electronics Letters, 35, 1831-1832., N is set to have a value larger than the bit length of P.

For example, in a case that N is set to have {(the bit length of P)+2}, the condition $0 \le Z < 2P$ is satisfied by performing the processing of the pseudocode for $0 \le A$ and $B \le 2P$. For another example, in a case that N is set to have {(the bit length of P)+4}, the condition $0 \le Z < 4P$ is satisfied by performing the processing of the pseudocode for $0 \le A$ and $B \le 4P$. Therefore, the calculation result Z of Montgomery multiplication can be used as an input to other Montgomery multiplication. In addition, the calculation result of modular addition can be used as an input to Montgomery multiplication. Moreover, similarly to modular addition, calculation of the quotient to Z with a comparator and storing the calculated quotient into a quotient buffer enable the calculation result of Montgomery multiplication to be used as an input to different modular addition.

Before the pseudocode illustrated in FIG. 9 is performed, an input unit 10 inputs the characteristic P(k), A(k), and B(k). The input unit 10 inputs P'. P' corresponds to $-P^{-1}|\text{mod}|\ 2^N$. Note that P' may be calculated by the arithmetic device 1.

In first loop processing with k varying from 0 to a value below $m \times 2-1$ (Description 641), the arithmetic device 1 performs second loop processing (Description 642) and comparison processing between k and m+1. In the second loop processing with j varying from the maximum value for 0 and k−m+1 to the minimum value for m and k+1, the processing of addition to the variable U is performed.

Figure 10:
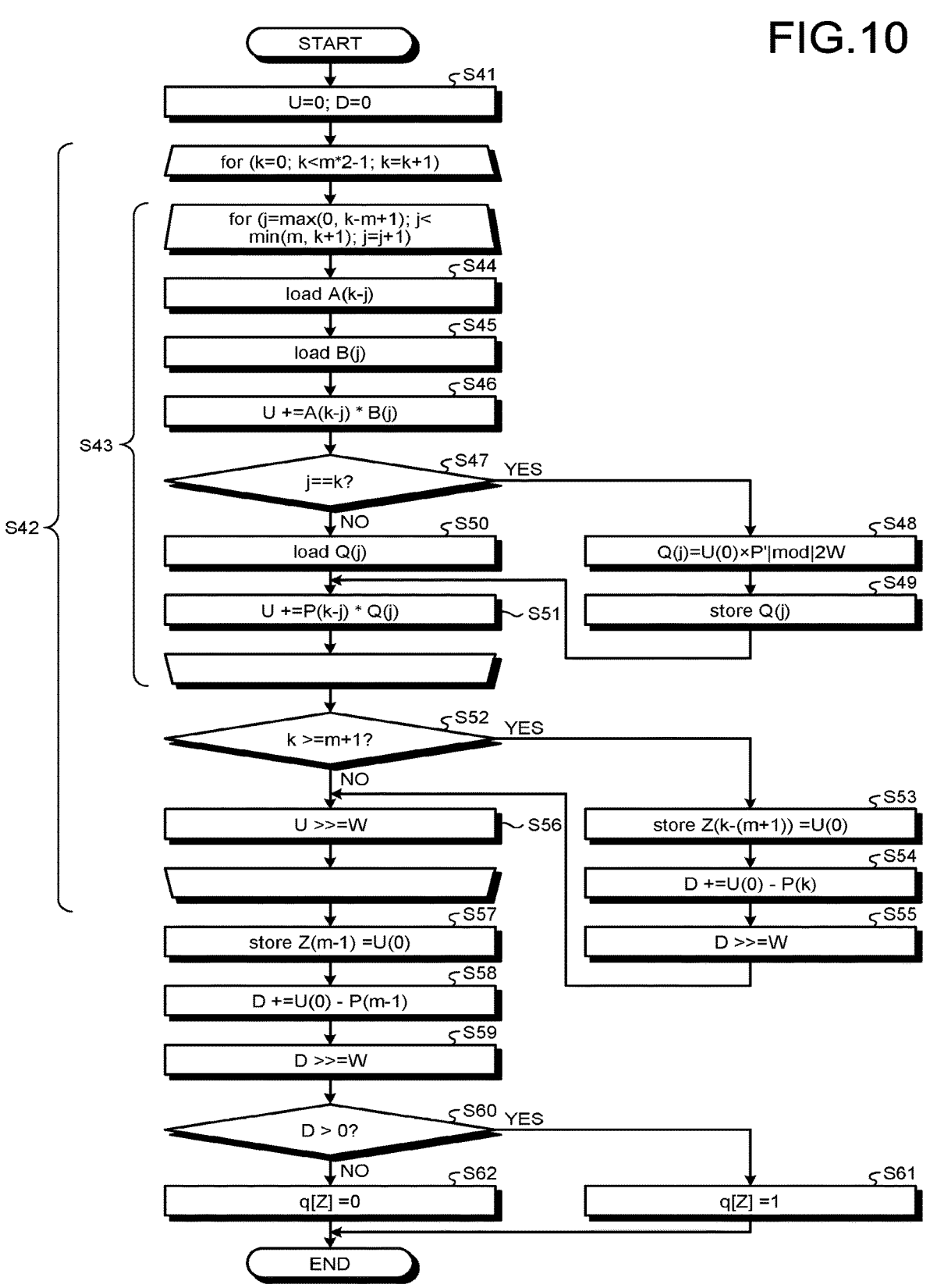
FIG. 10 is a flowchart of the Montgomery multiplication according to the third embodiment.

Next, a processing procedure according to the third embodiment will be described with a flowchart based on the pseudocode illustrated in FIG. 10. First, the input unit 10 initializes the variables U and D (Step S41). Subsequently, the arithmetic device 1 performs loop processing until the variable k reaches $m \times 2-1$ (Step S42). In the loop processing indicated in Step S42, the arithmetic device 1 performs the loop processing of Step S43 and the comparison processing indicated in Step S54.

In the loop processing indicated in Step S43, the input unit 10 inputs A(k−j) (Step S44). Then, the input unit 10 inputs B(k) (Step S45).

After that, an adder/multiplier 11 adds A(k−j)×B(j) to the variable U (Step S46). When j is equal to k (Step S47: Yes), the adder/multiplier 11 inputs U(0)×|mod| $2^W$ into the variable Q(j) (Step S48). Then, the output unit 14 outputs Q(j) (Step S49), and the processing proceeds to Step S51.

In Step S47, when j is not equal to k (Step S47: No), the input unit 10 inputs the variable Q(j) (Step S50). In Step S51, the adder/multiplier 11 adds the characteristic P(k−j)× the variable Q(j) to the variable U (Step S51).

After the loop processing S43, when k is not less than m+1 (Step S52: Yes), the output unit 14 inputs U(0) into Z(k−(m+1)) and outputs Z(k−(m+1)) having U(0) input therein (Step S53). The comparator 13 adds, to the variable D, the difference between U(0) and P(k) (Step S54). The comparator 13 shifts the variable D by W bits (Step S55). In Step S56, the arithmetic device 1 shifts the variable U by W bits (Step S56).

After finishing the loop processing S42, the output unit 14 inputs U(0) into Z(m−1) and outputs Z(m−1) having U(0) input therein (Step S57). The comparator 13 adds, to the variable D, the difference between U(0) and P(m−1) (Step S58). The comparator 13 shifts the variable D by W bits (Step S59).

Subsequently, in the processing of Step S60, the output unit 14 determines whether or not the variable D is more than 0 (Step S60). When the variable D is more than 0 (Step S60: Yes), the output unit 14 outputs a value of 1 to q[Z] (Step S61). In the processing of Step S60, when the variable D is not more than 0 (Step S60: No), the output unit 14 outputs 0 to q[Z] in a quotient buffer (Step S62).

The arithmetic device 1 according to the present embodiment computes Montgomery multiplication Z=A×B×2⁻ₙ|mod| P by using the value N of the bit length of the characteristic P. Therefore, even when Montgomery multiplication is performed, the arithmetic device 1 according to the present embodiment has an effect similar to the effect of the arithmetic device 1 according to the first embodiment.

Fourth Embodiment

Figure 11:
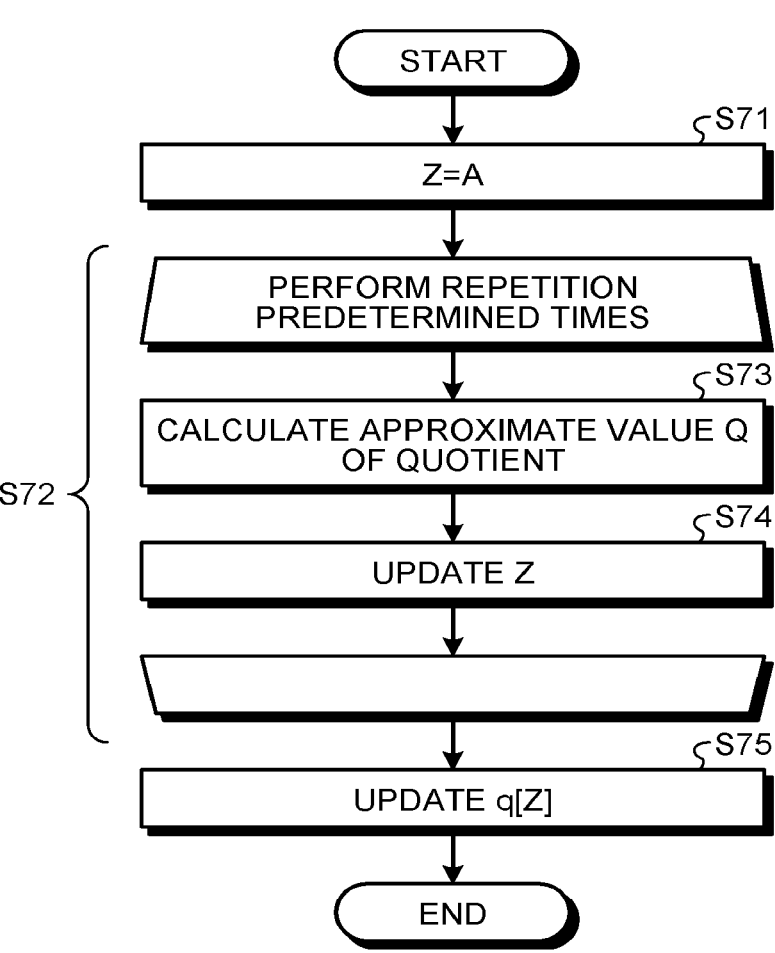
FIG. 11 is a flowchart of a modulo operation according to a fourth embodiment.

In a fourth embodiment, an exemplary modulo operation will be described. A memory system 300 according to the present embodiment is similar in configuration to the memory system 300 according to the first embodiment illustrated in FIG. 1. An arithmetic device 1 according to the present embodiment is similar in functional configuration to the arithmetic device 1 according to the first embodiment illustrated in FIG. 2. The arithmetic device 1 performs a modulo operation Z=A|mod| P. Hereinafter, a processing procedure for modulo operation Z=P will be described with a flowchart illustrated in FIG. 11. Note that, in this modulo operation, the word number of A may be larger than the word number of P. The modulo operation is used for, for example, calculation of the constant $R^2=2^{2m}$|mod| P which is needed in Montgomery multiplication.

First, an input unit 10 inputs A into Z (Step S71). Then, the arithmetic device 1 performs the loop processing of Step S72. The arithmetic device 1 performs the loop processing of Step S72 as long as k is not less than m−1 and not more than 1 (a small letter for L)−1. Here, the small letter "l"

represents the word number of Z, and m represents the word number of the characteristic P.

An adder/multiplier 11 calculates the approximate value Q of the quotient by using the respective higher-order words of Z and P only. For example, the adder/multiplier 11 calculates the approximate value Q of the quotient Z/(P<<s), as the shift amount s=W*(k−(m−1)) (Step S73). Subsequently, the adder/multiplier 11 updates Z (Step S74). Specifically, the adder/multiplier 11 calculates Z=Z−Q*(P<<s). As above, the adder/multiplier 11 performs multiplication of one word×a multiple-precision integer and subtraction between multiple-precision integers. The output unit 14 outputs the calculated Z.

The remainder Z can be obtained by executing the loop processing above. However, because of use of the approximate value, the condition 0≤Z<P is not necessarily satisfied. For example, the condition 0≤Z<2P may occur. The comparator 13 compares the value of Z and the value of P, and then updates q[Z] (Step S75). Note that, in a case where Z is larger than P, the value of Z can be corrected to satisfy the condition 0≤Z<P by subtracting P from Z. However, in the arithmetic device 1 according to the present embodiment, the correction of Z is omitted.

The arithmetic device 1 according to the fourth embodiment computes the remainder Z by repeating the computation of: calculating the approximate value of the quotient obtained when the input value is divided by the characteristic P; and subtracting the product of P and the approximate value from the input value, by using the higher-order word of the input value and the higher-order word of the characteristic P. With a reduction in throughput due to omission of correcting the value of Z in a case where Z is larger than P, the arithmetic device 1 according to the fourth embodiment outputs q[Z] like the arithmetic device 1 according to the first embodiment, resulting in having an effect similar to the effect of the arithmetic device 1 according to the first embodiment.

Fifth Embodiment

Figure 12:
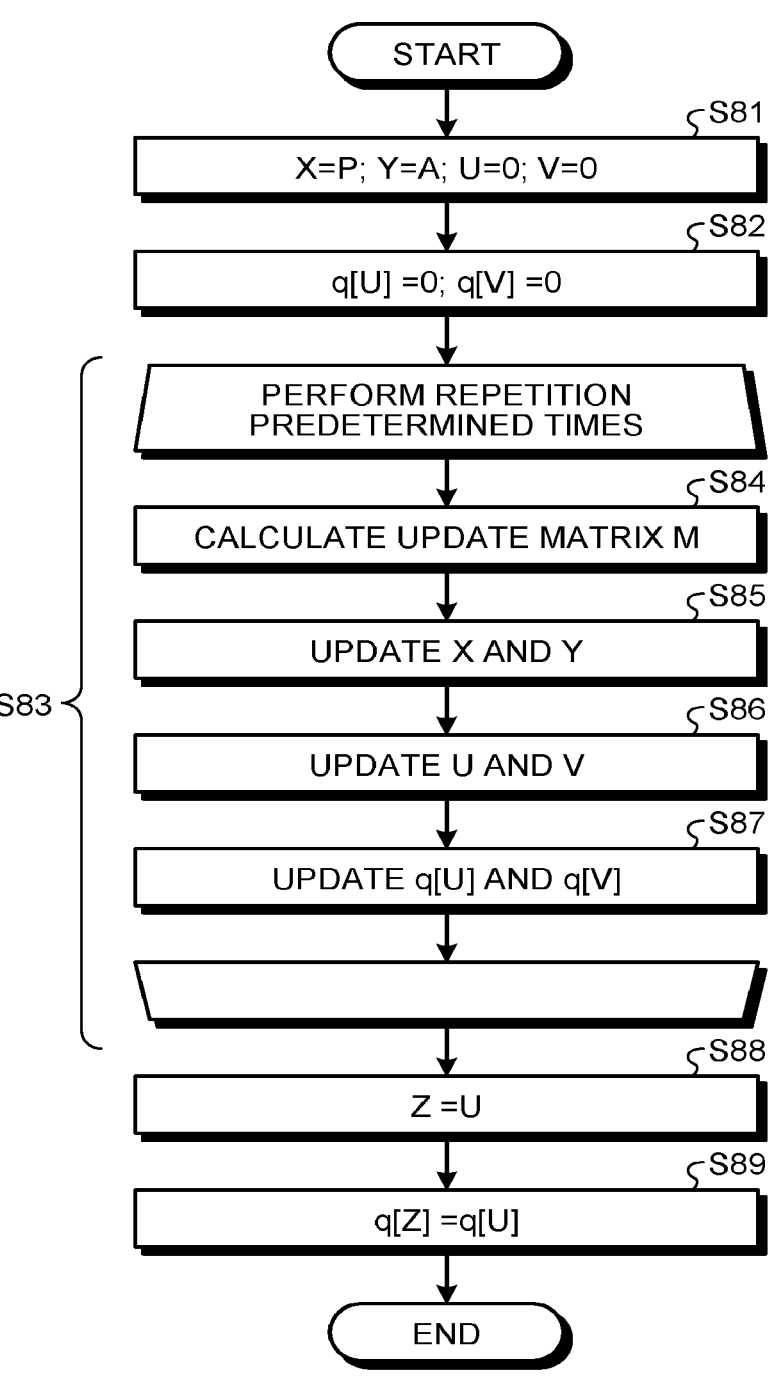
FIG. 12 is a flowchart of modular division according to a fifth embodiment.

In a fifth embodiment, exemplary modular division will be described. A memory system 300 according to the present embodiment is similar in configuration to the memory system 300 according to the first embodiment illustrated in FIG. 1. An arithmetic device 1 according to the present embodiment is similar in functional configuration to the arithmetic device 1 according to the first embodiment illustrated in FIG. 2. The arithmetic device 1 performs modular division Z=A×B⁻¹|mod| P. Hereinafter, a processing procedure for modular division Z=A×B⁻¹|mod| P, which is based on an extended binary GCD method, will be described with a flowchart illustrated in FIG. 12.

First, the arithmetic device 1 sets the conditions: X=P, Y=A, U=0, and V=0 (Step S81). As above, the arithmetic device 1 initializes the respective quotient flags of U and V to 0. Then, the arithmetic device 1 sets 0 on the variable q[U] and the variable q[V] (Step S82). The arithmetic device 1 performs the loop processing of Step S83.

Specifically, in the loop processing of Step S83, the arithmetic device 1 first calculates an update matrix M by using the word of part of X and the word of part of Y (Step S84). With this calculation, the arithmetic device 1 can obtain an update matrix without using multiple-precision arithmetic.

An adder/multiplier 11 updates X and Y on the basis of the update matrix M, X, and Y (Step S85). For example, the adder/multiplier 11 multiplies the update matrix M by a vector including, as elements, the current X and Y, and generates a vector including, as elements, the updated X and Y, to update X and Y. The adder/multiplier 11 determines whether the updated Y is a positive value or a negative value. When the updated Y is negative, the adder/multiplier 11 sign-inverts Y for updating. Note that, in this case, the adder/multiplier 11 may update the update matrix M.

The adder/multiplier 11 updates U and V (Step S86). The adder/multiplier 11 updates the value of U and the value of V in accordance with U=U–P*q[U] and V=V–P*q[V], respectively. Then, the adder/multiplier 11 updates U and V with multiplication of the update matrix M. Then, the comparator 13 calculates the respective quotients by dividing the updated U and V by P, and stores each calculated result into the corresponding q[U] or q[V] in the quotient buffer (Step S87).

The output unit 14 inputs U into Z and outputs Z having U input therein (Step S88). Then, the output unit 14 copies q[U] onto q[Z] (Step S89).

As described above, the arithmetic device 1 according to the fifth embodiment stores q[U] and q[V] for the intermediate variables U and V in the extended binary GCD method, so that the effect in calculation of U and V is similar to the effect in the first embodiment. The arithmetic device 1 according to the fifth embodiment outputs q[Z] for the arithmetic result Z with the extended binary GCD method like the arithmetic device 1 according to the first embodiment, so that the effect in the following processing is similar to the effect in the first embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A system, comprising:
a memory circuit having a storage region storing firmware; and
a signature verification circuit configured to obtain a digital signature and having an arithmetic device outputting an arithmetic result on a finite field with characteristic P, the arithmetic device comprising:
a hardware processor configured to
perform readout processing of a plurality of input values,
perform, for each word, arithmetic operations with respect to the plurality of input values by using a value being based on the characteristic P and a comparison value between each input value of the plurality of input values and the characteristic P,
output a first output value resulting from computing a value being based on each input value of the plurality of input values, the comparison value, and the characteristic P, and
output a second output value resulting from comparing the first output value and the characteristic P,
wherein the signature verification circuit is configured to:
perform an arithmetic operation using the hardware processor on a first part of the signature using the arithmetic device, obtain a value using a public key and the first part of the signature,
determine whether the value matches a second part of the signature different from the first part of the signature,
when the value matches the second part of the signature, permit execution of the firmware to begin, and
when the value does not match the second part of the signature, does not permit execution of the firmware to begin.

2. The system according to claim 1, wherein
the hardware processor is configured to obtain the comparison value by multiple-precision arithmetic of each input value of the plurality of input values and the characteristic P.

3. The system according to claim 1, wherein each input value of the plurality of input values is signature data.

4. The system according to claim 2, wherein the multiple-precision arithmetic is division processing.

5. The system according to claim 1, wherein the hardware processor is configured to
obtain the comparison value by multiple-precision arithmetic of each input value of the plurality of input values and the characteristic P, and
perform, in parallel,
readout processing of each input value of the plurality of input values, and
multiple-precision arithmetic of an input value having been read out and the characteristic P.

6. The system according to claim 1, wherein the characteristic P is odd in number.

7. The system according to claim 1, wherein, before performing the arithmetic operations with respect to the plurality of input values, the hardware processor is configured to perform processing of adding the characteristic P to a value of a variable that stores an arithmetic result for each input value of the plurality of input values.

8. The system according to claim 1, wherein the hardware processor is configured to compute the value being based on the comparison value and the characteristic P, on a basis of a result of multiplication with respect to the plurality of input values.

9. A system, comprising:
a memory circuit having a storage region storing firmware; and
a signature verification circuit configured to obtain a digital signature and having an arithmetic device outputting an arithmetic result on a finite field with characteristic P, the arithmetic device comprising:
a hardware processor configured to
perform readout processing of an input value,
calculate an approximate value of a remainder resulting from dividing the input value by the characteristic P, the approximate value being calculated on a basis of a higher-order word of the input value and a higher-order word of the characteristic P,
perform, for each word, arithmetic operations with respect to the input value by using a value being based on the approximate value and the characteristic P,
output a first output value resulting from computing a value being based on the input value, the approximate value, and the characteristic P, and
output a second output value resulting from comparing the first output value and the characteristic P,
wherein the signature verification circuit is configured to:

perform an arithmetic operation using the hardware processor on a first part of the signature using the arithmetic device, obtain a value using a public key and the first part of the signature, determine whether the value matches a second part of the signature different from the first part of the signature, when the value matches the second part of the signature, permit execution of the firmware to begin, and when the value does not match the second part of the signature, not permit execution of the firmware to begin.

10. A system, comprising:

a memory circuit having a storage region storing firmware and a digital signature; and a signature verification circuit configured to obtain the digital signature having an arithmetic device outputting an arithmetic result on a finite field with characteristic P, the arithmetic device comprising:

a hardware processor configured to perform readout processing of an input value, calculate an update matrix being based on the input value and the characteristic P, update, on a basis of the update matrix, the input value and the characteristic P, output a first output value resulting from computing a value being based on the input value, the update matrix, and the characteristic P, and output a second output value resulting from comparing the first output value and the characteristic P, wherein the signature verification circuit is configured to:

perform an arithmetic operation using the hardware processor on a first part of the signature using the arithmetic device, obtain a value using a public key and the first part of the signature, determine whether the value matches a second part of the signature different from the first part of the signature, when the value matches the second part of the signature, permit execution of the firmware to begin, and when the value does not match the second part of the signature, not permit execution of the firmware to begin.

11. A signature verification method, comprising:

storing firmware in a memory;

obtaining a digital signature;

performing an arithmetic operation using an arithmetic device on a first part of the signature;

obtaining a value using a public key and the first part of the signature, and determining whether the value matches a second part of the signature different from the first part of the signature, wherein performing the arithmetic operation comprises controlling the arithmetic device to output an arithmetic result on a finite field with characteristic P using a hardware processor, comprising:

performing readout processing of a plurality of input values;

performing, for each word, arithmetic operations with respect to the plurality of input values by using a value being based on the characteristic P and a comparison value between each input value of the plurality of input values and the characteristic P;

outputting a first output value resulting from computing a value being based on each input value of the plurality of input values, the comparison value, and the characteristic P; and outputting a second output value resulting from comparing the first output value and the characteristic P, when the value matches the second part of the signature, execution of the firmware is permitted to begin, and when the value does not match the second part of the signature, execution of the firmware does not begin.

12. The method according to claim 11, further comprising obtaining the comparison value by multiple-precision arithmetic of each input value of the plurality of input values and the characteristic P.

13. The method according to claim 11, wherein each input value of the plurality of input values is signature data.

14. The method according to claim 12, wherein the multiple-precision arithmetic is division processing.

15. The method according to claim 11, further comprising:

obtaining the comparison value by multiple-precision arithmetic of each input value of the plurality of input values and the characteristic P; and performing, in parallel, readout processing of each input value of the plurality of input values, and multiple-precision arithmetic of an input value having been read out and the characteristic P.

16. The method according to claim 11, wherein the characteristic P is odd in number.

17. The method according to claim 11, further comprising, before the performing the arithmetic operations with respect to the plurality of input values, performing processing of adding the characteristic P to a value of a variable that stores an arithmetic result for each input value of the plurality of input values.

18. The method according to claim 11, further comprising computing the value being based on the comparison value and the characteristic P, on a basis of a result of multiplication with respect to the plurality of input values.

19. A method of controlling an arithmetic device in a signature verification circuit of a system having a memory storing firmware, the arithmetic device outputting an arithmetic result on a finite field with characteristic P using a hardware processor, the method comprising:

performing readout processing of an input value;

calculating an approximate value of a remainder resulting from dividing the input value by the characteristic P, the approximate value being calculated on a basis of a higher-order word of the input value and a higher-order word of the characteristic P;

performing, for each word, arithmetic operations with respect to the input value by using a value being based on the approximate value and the characteristic P;

outputting a first output value resulting from computing a value being based on the input value, the approximate value, and the characteristic P;

outputting a second output value resulting from comparing the first output value and the characteristic P;

obtaining a digital signature;

performing an arithmetic operation using the arithmetic device on a first part of the signature;

obtaining a value using a public key and the first part of the signature using the signature verification circuit, and determining whether the value matches a second part of the signature different from the first part of the signature using the signature verification circuit, when the value matches the second part of the signature, execution of the firmware is permitted to begin, and when the value does not match the second part of the signature, execution of the firmware does not begin.

20. A method of controlling an arithmetic device in a signature verification circuit of a system having a memory storing firmware and a digital signature, the arithmetic device outputting an arithmetic result on a finite field with characteristic P using a hardware processor, the method comprising:

performing readout processing of an input value;

calculating an update matrix being based on the input value and the characteristic P;

updating, on a basis of the update matrix, the input value and the characteristic P;

outputting a first output value resulting from computing a value being based on the input value, the update matrix, and the characteristic P;

outputting a second output value resulting from comparing the first output value and the characteristic P;

obtaining the digital signature;

performing an arithmetic operation using the arithmetic device on a first part of the signature;

obtaining a value using a public key and the first part of the signature using the signature verification circuit, and determining whether the value matches a second part of the signature different from the first part of the signature using the signature verification circuit, when the value matches the second part of the signature, execution of the firmware is permitted to begin, and when the value does not match the second part of the signature, execution of the firmware does not begin.

* * * * *